US008967353B2

(12) United States Patent
Roses et al.

(10) Patent No.: US 8,967,353 B2
(45) Date of Patent: Mar. 3, 2015

(54) TRANSMISSION WITH INTERNAL ISOLATOR AND BY-PASS CLUTCH

(75) Inventors: Victor M. Roses, Ann Arbor, MI (US); John A. Diemer, Farmington Hills, MI (US); Randy Lewis Melanson, Pinckney, MI (US); Douglas John Dwenger, Plymouth, MI (US); Randal William Arndt, Belleville, MI (US); Pete R. Garcia, Troy, MI (US); Michael L. Duhaime, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1499 days.

(21) Appl. No.: 12/609,227

(22) Filed: Oct. 30, 2009

(65) Prior Publication Data

US 2011/0100157 A1 May 5, 2011

(51) Int. Cl.
*F16H 57/028* (2012.01)
*F16F 15/123* (2006.01)
*F16D 25/08* (2006.01)

(52) U.S. Cl.
CPC ............ *F16D 25/082* (2013.01); *F16F 15/123* (2013.01); *F16H 57/028* (2013.01)
USPC ..................................... 192/55.61; 192/70.17

(58) Field of Classification Search
USPC .................... 192/55.61, 212, 214, 214.1, 202
See application file for complete search history.

(56) References Cited

U.S. PATENT DOCUMENTS

| 4,928,486 | A | * | 5/1990 | Despres .......................... 60/338 |
| 5,863,274 | A | * | 1/1999 | Jackel ............................ 475/347 |
| 6,033,335 | A | * | 3/2000 | Hotta et al. .................... 475/269 |
| 6,062,359 | A | * | 5/2000 | Rohs et al. .................... 192/3.29 |
| 6,371,857 | B1 | * | 4/2002 | Kono et al. ................ 464/68.92 |
| 6,675,457 | B1 | | 1/2004 | Redmond et al. |
| 6,910,562 | B2 | * | 6/2005 | Bauer et al. ................ 192/70.17 |
| 7,232,402 | B2 | * | 6/2007 | Tryon et al. ........................ 477/5 |
| 7,780,567 | B2 | | 8/2010 | Hendrickson et al. |
| 2006/0063632 | A1 | * | 3/2006 | Hiraku et al. ................. 475/214 |
| 2009/0090593 | A1 | | 4/2009 | Mu et al. |

FOREIGN PATENT DOCUMENTS

CN 101334108 A 12/2008

* cited by examiner

*Primary Examiner* — Gene Crawford
*Assistant Examiner* — Ryan Dodd
(74) *Attorney, Agent, or Firm* — Quinn Law Group, PLLC

(57) ABSTRACT

A transmission includes a housing defining a sealed interior and an input hub rotatably coupled to the housing. A gear set is disposed within the housing and configured for receiving a torque from an engine. The transmission further includes an isolator assembly and a bypass clutch, each disposed within the sealed interior of the housing. The isolator assembly is configured for selectively damping drivetrain inertia and/or vibration. The bypass clutch selectively engages and disengages the isolator assembly.

12 Claims, 2 Drawing Sheets

TRANSMISSION WITH INTERNAL ISOLATOR AND BY-PASS CLUTCH

TECHNICAL FIELD

The subject invention generally relates to a transmission, and more specifically to a vibration/inertia isolator for a transmission.

BACKGROUND OF THE INVENTION

A drivetrain of a vehicle typically includes an engine and a transmission mounted to the engine. A crankshaft of the engine transmits a torque to an input hub of the transmission. The input hub transmits the torque through a gear set, which increases or reduces a rotational speed of the engine. The torque is then transferred to at least one wheel of the vehicle to drive the vehicle.

Often, especially in hybrid vehicles, an inertia/vibration isolator is disposed between the engine and the transmission, and interconnects the driveshaft of the engine and the input hub of the transmission. The isolator typically includes a plurality of radially spaced springs, which dampen vibration between the transmission and the engine. This is particularly important in hybrid vehicles where high motor inertia may create an excessive impact load that is transmitted to the engine.

A by-pass clutch may be coupled to the isolator to deactivate the isolator when the engine is started. Accordingly, during normal operation of the vehicle, the by-pass clutch is disengaged, and thereby the isolator is active. When starting the engine, the by-pass clutch is engaged and the isolator is deactivated.

The isolator and the by-pass clutch are disposed outside of the transmission, between the transmission and the engine. The by-pass clutch may include a dry clutch, or may alternatively include a wet clutch. When the by-pass clutch includes a wet clutch, the by-pass clutch and the isolator are disposed within a sealed pressure vessel in order to supply the wet clutch with the necessary fluid in which to operate.

SUMMARY OF THE INVENTION

A transmission for a vehicle is provided. The transmission includes a housing, which defines a sealed interior. The housing is configured for attachment to an engine. The transmission further includes an input hub, which is rotatably coupled to the housing for rotation about a longitudinal axis. The input hub is configured for receiving a torque from the engine. The transmission further includes an isolator assembly mounted to the input hub. The isolator assembly is disposed within the sealed interior of the housing, and is configured for damping drivetrain inertia or vibration.

In another aspect of the invention, a transmission for a vehicle is also provided. The transmission includes a housing, which defines a sealed interior. The housing is configured for attachment to an engine. An input hub is rotatably coupled to the housing for rotation about a longitudinal axis. The input hub is configured for receiving a torque from the engine. A gear set is disposed within the sealed interior, and is supported by the housing. The gear set is configured for transferring the torque to at least one wheel of the vehicle. An isolator assembly is disposed within the sealed interior, and mounted to the input hub. The isolator assembly includes a plate, an output cage, and at least one spring. The plate is mounted to the input hub, and extends radially outward from the input hub relative to the longitudinal axis. The output cage is coupled to the gear set and selectively coupled to the plate. The at least one spring selectively interconnects the plate and the output cage. A bypass clutch is supported by the housing and disposed within the sealed interior of the housing. The bypass clutch is configured for moving the at least one spring between an engaged position and a disengaged position. The engaged position interconnects the plate and the output cage. The disengaged position disconnects the plate and the output cage.

In another aspect of the invention, a transmission for a vehicle is provided. The transmission includes a housing, which defines a sealed interior. The housing is configured for attachment to an engine. An input hub is rotatably coupled to the housing for rotation about a longitudinal axis. The input hub is configured for receiving a torque from the engine. An isolator assembly is mounted to the input hub, and is disposed within the sealed interior of the housing. The isolator assembly is configured for selectively damping drivetrain inertia or vibration. A bypass clutch is supported by the housing within the sealed interior of the housing. The bypass clutch is configured for selectively engaging the isolator assembly to allow torque transfer through the isolator assembly, and for disengaging the isolator assembly to prevent torque transfer through the isolator assembly.

Accordingly, the disclosed transmission incorporates the isolator assembly and the bypass clutch into the sealed interior of the housing. Having the isolator assembly and the bypass clutch disposed within the sealed interior of the transmission permits use of a wet clutch as the bypass clutch, without requiring a separate pressure vessel. Additionally, the bypass clutch may be fixed relative to the housing so as not to be affected by engine speed, which improves the performance of the bypass clutch. Furthermore, because the isolator and bypass clutch are disposed within the housing of the transmission, the packaging of the drivetrain, i.e., the engine and the transmission, for each individual vehicle design is simplified be eliminating the space required for an external isolator and bypass clutch.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
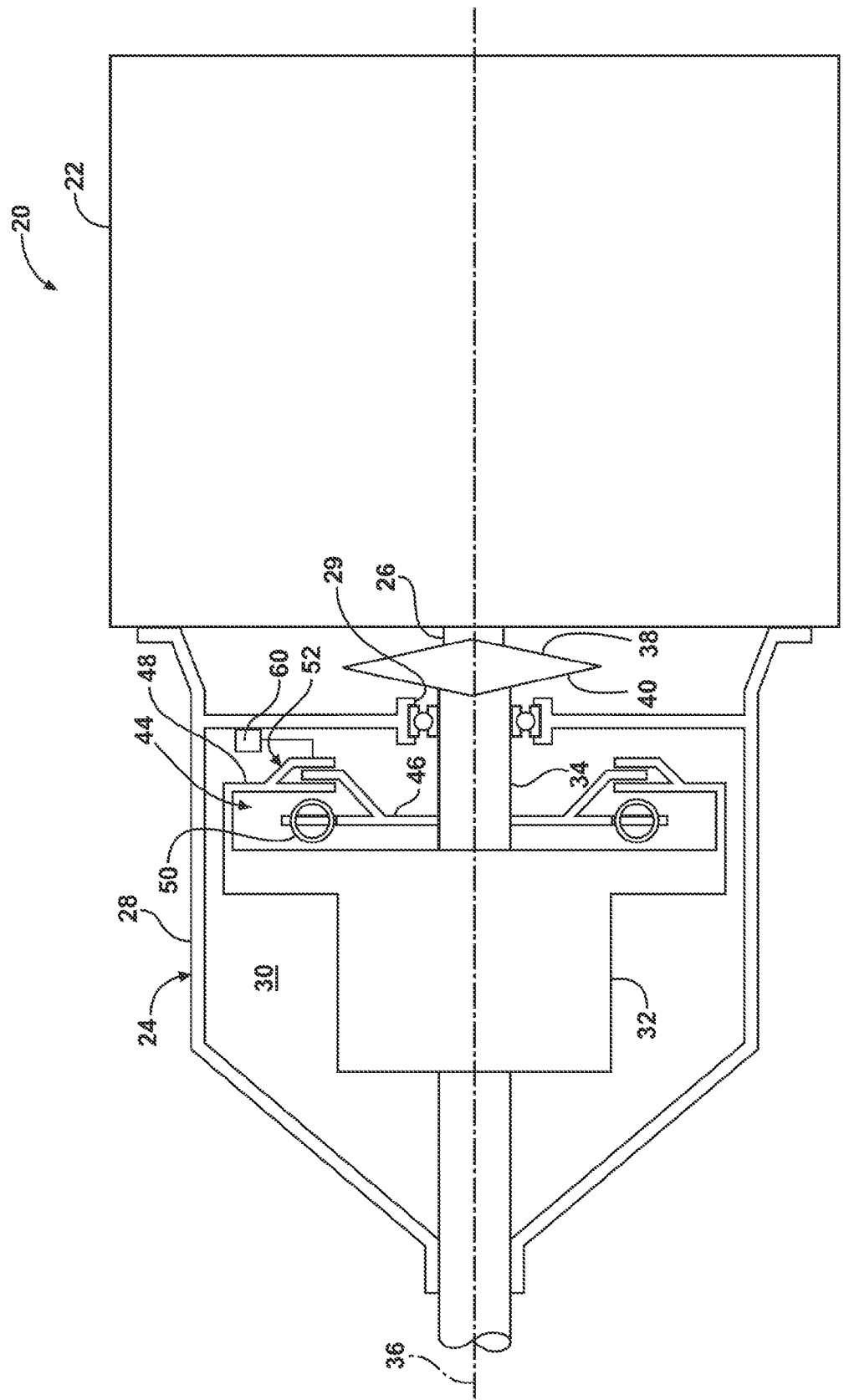
FIG. 1 is a schematic diagram of a drivetrain for a vehicle.

Referring to the Figures, wherein like numerals indicate like parts throughout the several views, a vehicle powertrain is shown generally at 20 in FIG. 1. The powertrain 20 includes, but is not limited to, an engine 22 and a transmission 24. The engine 22 supplies a torque to the transmission 24, with the transmission 24 transferring the torque to at least one wheel of the vehicle. The engine 22 includes an output shaft, i.e., a crankshaft 26, through which the torque is transferred from the engine 22 to the transmission 24.

The engine 22 may include, but is not limited to, an internal combustion engine 22 or an electric motor. It should be appreciated that the engine 22 may include some other type of engine capable of providing torque, i.e., power, for the vehicle, and may include a combination of engines, such as a combination of an electric motor and an internal combustion engine.

Figure 2:
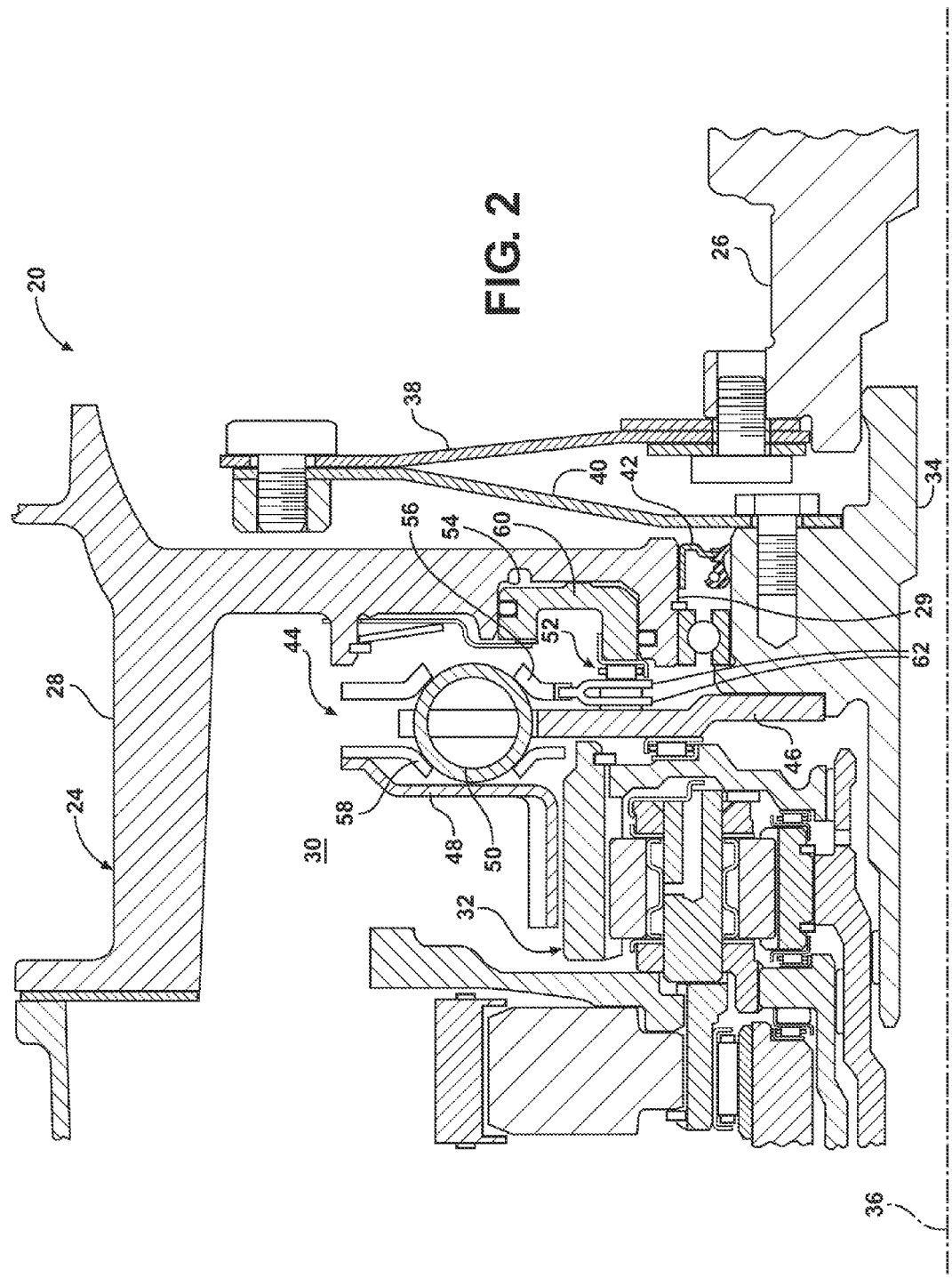
FIG. 2 is a schematic fragmentary cross sectional view of a transmission of the drivetrain.

Referring to FIGS. 1 and 2, the transmission 24 includes a housing 28 that is configured for attachment to the engine 22. Accordingly, the housing 28 may include any shape, configuration and/or size suitable for the specific vehicle and engine 22 for which the transmission 24 is intended.

The housing 28 of the transmission 24 at least partially defines a sealed interior 30. The interior 30 is substantially enclosed and/or bounded by the housing 28. As such, the housing 28 completely surrounds an interior region, which is defined as the interior of the housing 28. The housing 28 may include one or more openings to allow shafts, fittings, or other components of the transmission to pass through the housing 28 and into or out of the interior 30, however, a person of ordinary skill in the art will appreciate that these openings may be sealed, such as by a seal, gasket, etc., to define a sealed interior 30. The transmission 24 includes a fluid, i.e., transmission fluid, disposed within the sealed interior 30 as is well known. The housing 28 houses or contains the various components of the transmission 24, and may include, as noted above, one or more seals, gaskets, etc., to maintain a tight seal and secure the fluid within the sealed interior 30.

The transmission 24 includes a gear set 32 disposed within the sealed interior 30. The gear set 32 may include any suitable combination of gears suitable for the intended use of the transmission 24. The gears may include one or more planetary gears as is well known in the art. The transmission 24 directs the torque through the gear set 32 to vary a speed of a rotational output of the transmission 24.

The transmission 24 further includes an input hub 34. The input hub 34 is rotatably coupled to and supported by the housing 28 for rotation about a longitudinal axis 36. The longitudinal axis 36 runs along a centerline of the transmission 24. The input hub 34 is configured for receiving the torque from the engine 22. As shown, the input hub 34 is partially disposed within the interior 30 of the housing 28, and extends through an opening 29 in the housing 28 for connection to the crankshaft 26 of the engine 22. A flex plate 38 is attached to the crankshaft 26 of the engine 22. The flex plate 38 extends radially outward from the crankshaft 26 to a distal radial edge. A transmission 24 input plate 40 couples the flex plate 38 to the input hub 34 outside of the interior 30 of the housing 28. The transmission input plate 40 is attached to the flex plate 38 near the distal radial edge of the flex plate 38, and extends radially inward toward the longitudinal axis 36 to attach the transmission input plate 40 to the input hub 34.

The input hub 34 extends through an aperture in the housing 28 and into the sealed interior 30. As noted above, the input hub 34 rotates about the longitudinal axis 36. Accordingly, the transmission 24 includes a hub seal 42 configured for sealing the input hub 34 relative to the housing 28 to secure the transmission fluid within the sealed interior 30.

The transmission 24 further includes an isolator assembly 44 mounted to the input hub 34. The isolator assembly 44 is disposed within the sealed interior 30 of the housing 28. The isolator assembly 44 is configured for selectively damping inertia and/or vibration within the drivetrain. Accordingly, the disclosed transmission 24 positions the isolator assembly 44 within the sealed interior 30 of the housing 28, instead of outside of the housing 28 between the transmission 24 and the engine 22 as is common in prior art drivetrains. Placing the isolator assembly 44 inside the sealed interior 30 of the housing 28 simplifies the connection between the engine 22 and the transmission 24, and provides for a consistent drivetrain package across different vehicle platforms, i.e., the same transmission 24 with the internal isolator assembly 44 may be utilized on different vehicles with different engines without the need to customize the position of the isolator assembly 44 for each different vehicle.

The isolator assembly 44 includes an isolator plate 46, an output cage 48, and at least one isolator spring 50 disposed between the isolator plate 46 and the output cage 48. The isolator plate 46 is mounted to the input hub 34. The isolator plate 46 is disposed within the sealed interior 30, and extends radially outward away from the input hub 34 and the longitudinal axis 36. The isolator plate 46 is rotatable with the input hub 34 about the longitudinal axis 36. The isolator plate 46 may be attached to the input hub 34 in any suitable manner capable of transmitting rotation between the input hub 34 and the isolator plate 46. For example, the isolator plate 46 may be attached to the input hub 34 by threaded bolts or the like. Alternatively, the input hub 34 may be integrally formed with the isolator plate 46. It should be appreciated that the isolator plate 46 may be attached to the input hub 34 in some other manner not shown or described herein.

The output cage 48 is disposed within the sealed interior 30, and is coupled to the gear set 32. The output cage 48 may be coupled to the gear set 32 in any suitable manner capable of transmitting torque, i.e., rotation, to the gear set 32. For example, the output cage 48 may be directly attached to a ring gear of a planetary gear set 32. It should be appreciated that the output cage 48 may be coupled to the gear set 32 in some other manner not shown or described herein. The torque flows from the engine 22 to the input hub 34, from the input hub 34 to the isolator plate 46, from the isolator plate 46 to the output cage 48, and from the output cage 48 to the gear set 32. Accordingly, the output cage 48 supplies the input torque to the gear set 32.

The output cage 48 is also selectively coupled to the isolator plate 46 through the at least one isolator spring 50. Preferably, the at least one isolator spring 50 includes a plurality of isolator springs 50. The isolator springs 50 typically include a coil spring. However, it should be appreciated that the isolator springs 50 may include some other manner of spring. The isolator springs 50 are supported by the isolator plate 46 and radially spaced from the longitudinal axis 36.

The transmission 24 further includes a bypass clutch 52 supported by the housing 28, and disposed within the sealed interior 30 of the housing 28. The housing 28 defines a pocket 54 within the sealed interior 30, with the bypass clutch 52 at least partially disposed within the pocket 54. The bypass clutch 52 is mounted to the housing 28 and is stationary relative to the rotation of the input hub 34 about the longitudinal axis 36. Accordingly, performance of the bypass clutch 52 is not affected by the speed of the engine 22, thereby increasing the performance of the bypass clutch 52.

The bypass clutch 52 is configured for selectively disengaging the isolator springs 50 to prevent torque transfer through the isolator assembly 44 using active isolator spring 50 isolation. More specifically, the bypass clutch 52 is configured for moving the isolator springs 50 between an engaged position interconnecting the isolator plate 46 and the output cage 48, and a disengaged position disconnecting the isolator plate 46 and the output cage 48.

As shown, the isolator plate 46 includes plate tabs 56 configured for supporting the isolator springs 50, and the output cage 48 includes cage tabs 58, also configured for supporting the isolator springs 50. The bypass clutch 52 urges one or more of the plate tabs 56 against and into frictional engagement with the isolator springs 50 when in the engaged position. The isolator springs 50 are biased against the cage tabs 58 by the plate tabs 56. Accordingly, when the bypass clutch 52 is in the engaged position, the plate tabs 56 and the cage tabs 58 grasp the isolator springs 50, with the isolator springs 50 interconnecting the isolator plate 46 and the output cage 48. When the bypass clutch 52 is in the disengaged position, the plate tabs 56 are not biased against the isolator springs 50, and the plate is free to rotate relative to the output cage 48.

As shown, the bypass clutch 52 includes a piston 60 and clutch plates 62. As is well known, the clutch plates 62 include driven clutch plates 62 and driving clutch plates 62, with the piston 60 actuated to apply pressure between the driven clutch plates 62 and the driving clutch plates 62 when the bypass clutch 52 is in the engaged position. The bypass clutch 52 is normally in the disengaged position. However, the bypass clutch 52 is engaged during engine 22 start. The bypass clutch 52 is disengaged after the engine 22 is started.

The bypass clutch 52 includes a wet clutch. Because the bypass clutch 52 is disposed within the sealed interior 30 of the housing 28, the fluid stored within the sealed interior 30 may be utilized to operate the wet clutch. The bypass clutch 52 may include any suitable type of clutch and may be configured in any suitable manner capable of urging the plate tabs 56 against the isolator springs 50.

While the best modes for carrying out the invention have been described in detail, those familiar with the art to which this invention relates will recognize various alternative designs and embodiments for practicing the invention within the scope of the appended claims.

The invention claimed is:

1. A transmission for a vehicle, the transmission comprising:
   a housing defining an interior and configured for attachment to an engine, wherein said interior is substantially enclosed and bounded by the housing;
   an input hub rotatably supported by said housing for rotation about a longitudinal axis, wherein said input hub is partially disposed within said interior and extends through an opening in said housing for connection to a crankshaft of the engine outside of said interior of said housing for receiving a torque from the engine; and
   an isolator assembly mounted to said input hub and disposed within said interior of said housing and configured for damping drivetrain inertia or vibration;
   wherein said isolator assembly includes an isolator plate mounted to said input hub within said interior and extending radially outward from said input hub relative to said longitudinal axis, said isolator plate rotatable with said input hub about said longitudinal axis; and
   a gear set disposed within said interior, and wherein said isolator assembly includes an output cage disposed within said interior and coupled to said gear set and selectively connected in torque communication to said isolator plate.

2. A transmission as set forth in claim 1 wherein said isolator assembly includes at least one spring supported by said isolator plate.

3. A transmission as set forth in claim 2 further comprising a bypass clutch supported by said housing and disposed within said interior of said housing, wherein said bypass clutch is moveable between an engaged position to connect torque transfer between said isolator plate and said output cage, and a disengaged position to disconnect torque transfer between said isolator plate and said output cage.

4. A transmission as set forth in claim 3 wherein said housing defines a pocket within said interior with said bypass clutch at least partially disposed within said pocket.

5. A transmission as set forth in claim 3 wherein said bypass clutch is mounted to said housing and stationary relative to said rotation of said input hub about said longitudinal axis.

6. A transmission as set forth in claim 3 further comprising a fluid disposed within said interior.

7. A transmission as set forth in claim 6 wherein said bypass clutch is a wet clutch.

8. A transmission for a vehicle, the transmission comprising:
   a housing defining an interior and configured for attachment to an engine, wherein said interior is substantially enclosed and bounded by the housing;
   an input hub rotatably supported by said housing for rotation about a longitudinal axis, wherein said input hub is partially disposed within said interior and extends through an opening in said housing for connection to a crankshaft of the engine outside of said interior of said housing for receiving a torque from the engine;
   a gear set disposed within said interior and configured for transferring the torque to at least one wheel of the vehicle;
   an isolator assembly disposed within said interior and mounted to said input hub within said interior, said isolator assembly including an isolator plate mounted to said input hub and extending radially outward from said input hub relative to said longitudinal axis, an output cage coupled to said gear set and selectively connected in torque communication to said isolator plate, and at least one spring selectively interconnecting said isolator plate and said output cage in torque communication therebetween; and
   a bypass clutch supported by said housing and disposed within said interior of said housing, wherein said bypass clutch is moveable between an engaged position to connect torque transfer between said isolator plate and said output cage, and a disengaged position to disconnect torque transfer between said isolator plate-and said output cage.

9. A transmission as set forth in claim 8 wherein said housing defines a pocket within said interior with said bypass clutch at least partially disposed within said pocket.

10. A transmission as set forth in claim 8 wherein said bypass clutch is mounted to said housing and stationary relative to said rotation of said input hub about said longitudinal axis.

11. A transmission as set forth in claim 8 further comprising a fluid disposed within said interior.

12. A transmission as set forth in claim 11 wherein said bypass clutch is a wet clutch.

* * * * *